United States Patent [19]

Perton et al.

[11] Patent Number: 5,472,809
[45] Date of Patent: Dec. 5, 1995

[54] LITHIUM RECHARGEABLE ELECTROCHEMICAL CELL

[75] Inventors: Françoise Perton, Beruges; Sylvie Baudry, Fontaine le Comte; Annie Porcheron, Smarves, all of France

[73] Assignee: Societe Anonyme Dite Saft, Romainville, France

[21] Appl. No.: 203,298

[22] Filed: Mar. 1, 1994

[30] Foreign Application Priority Data

Mar. 2, 1993 [FR] France ................... 93 02396

[51] Int. Cl.$^6$ .................................. H01M 10/40
[52] U.S. Cl. .................................. 429/197; 429/198
[58] Field of Search ................... 429/197, 198, 429/223, 224

[56] References Cited

U.S. PATENT DOCUMENTS

| | | | |
|---|---|---|---|
| 4,056,663 | 11/1977 | Schlaikjer | 429/197 |
| 4,786,499 | 11/1988 | Slane et al. | 429/197 |
| 5,270,134 | 12/1993 | Tobishima | 429/197 |

FOREIGN PATENT DOCUMENTS

| | | |
|---|---|---|
| 0490048A1 | 6/1992 | European Pat. Off. . |
| 0496613A2 | 7/1992 | European Pat. Off. . |
| 2641130 | 6/1990 | France . |

OTHER PUBLICATIONS

Japanese Patent Abstract 2-148664—dated Jun. 7, 1990.
Japanese patent Abstract JP3-055769 dated Mar. 11, 1991.
Japanese Patent Abstract JP4-1444775 dated May 28, 1992.
French Search Report FR 9302396 Dec. 6, 1993.

*Primary Examiner*—Stephen Kalafut
*Attorney, Agent, or Firm*—Sughrue, Mion, Zinn, Macpeak & Seas

[57] ABSTRACT

A lithium rechargeable electrochemical cell comprising an anode of pure or alloyed lithium or of lithium-containing carbon, a cathode of metal oxide, and an electrolyte comprising a mixture of aprotic organic solvents and a lithium salt, characterized by the fact that said mixture is made up of:

5% to 40% by volume of propylene carbonate;
10% to 20% by volume of ethylene carbonate; and
50% to 85% by volume of dimethyl carbonate.

8 Claims, 3 Drawing Sheets

LITHIUM RECHARGEABLE ELECTROCHEMICAL CELL

The present invention relates to a lithium rechargeable electrochemical cell capable of delivering high power at high current, even when used at low temperature.

Conventional electrolytes used in such lithium cells are constituted by a mixture of organic solvents associated with a lithium salt. The mixture of organic solvents is generally constituted by a mixture of esters and of ethers enabling solvents of high dielectric constant to be associated with solvents of low viscosity. However, the search for improved performance is presently directed towards using cathode materials that require the use of electrolytes that are capable of withstanding high oxidation potentials.

In several patents (EP-0 482 287, EP-0 490 048, and U.S. Pat. No. 5,192,629) electrochemical cells are described in which the electrolyte comprises a mixture of a cyclic carbonate and of a linear carbonate. Such mixtures have low conductivities (about 30% less than conventional mixtures), and the efficiency of lithium cycling in such electrolytes is low. The performance and lifetime of such a cell is limited.

A cell is also known having a polymer cathode and containing an electrolyte made up of a mixture of carbonates (FR-2 641 130). The maximum current density that such a cathode can withstand is about 100 µA/cm². The resulting generator has very low power, which puts a considerable constraint on the uses to which it can be put.

An object of the present invention is to provide a lithium secondary cell whose cycling performance under rapid conditions, and in particular at low temperature, is greater than that of known cells.

The present invention provides an electrolyte for a rechargeable cell having a lithium anode, the cell comprising an anode of pure or alloyed lithium or of lithium-containing carbon, a cathode of metal oxide, and an electrolyte comprising a mixture of aprotic organic solvents and a lithium salt, characterized by the fact that said mixture is constituted by:
5% to 40% by volume of propylene carbonate;
10% to 20% by volume of ethylene carbonate; and
50% to 85% by volume of dimethyl carbonate.

Improved performance at low temperatures, down to −40° C., is obtained by the presence of propylene carbonate (PC). The stability of the lithium in the electrolyte, and thus charge retention during storage, and the cycling efficiency of the lithium or of the lithium-containing carbon are all improved by having a quantity of ethylene carbonate (EC) that comprises at least 10% by volume. The EC causes a passivating layer to be formed that protects the anode. Above 20%, the viscosity of the electrolyte becomes too high and the performance of the cell drops.

The exceptional resistance of dimethyl carbonate (DMC) to oxidation confers particular stability to the electrolyte when it is used with a cathode material having high oxidation potential. The presence of DMC at a concentration of at least 50% by volume makes it possible to impregnate the separator and the electrodes thoroughly with electrolyte and limits the formation of dendrites on the lithium electrode. The use of DMC increases the conductivity of the electrolyte and provides increased lithium cycling efficiency. To achieve satisfactory operation at high current density, and in particular at low temperature, it is necessary to seek maximum conductivity for the electrolyte. Surprisingly, it has been observed that by adding 15% to 50% by volume of a mixture of PC and of EC to DMC, conductivity values are obtained that are considerably greater than when either PC only or EC only is added thereto. To retain a satisfactory level of performance at low temperature, it is undesirable to exceed 85% DMC.

In a preferred variant, the mixture comprises 20% by volume propylene carbonate (PC), 20% by volume ethylene carbonate (EC), and 60% by volume dimethyl carbonate. This composition of the solvent mixture makes it possible to limit loss of capacity to 40% on going from ambient temperature to −30° C.

In another variant, the mixture comprises 15% by volume of propylene carbonate (PC), 15% by volume of ethylene carbonate (EC), and 70% by volume of dimethyl carbonate.

In yet another variant, the mixture comprises 40% by volume of propylene carbonate (PC), 10% by volume of ethylene carbonate (EC), and 50% by volume of dimethyl carbonate. With this composition of solvent mixture, the loss of capacity is only 30% on going from ambient temperature to −30° C.

The lithium salt is selected from lithium hexafluoroarsenate $LiAsF_6$, lithium hexafluorophosphate $LiPF_6$, lithium tetrafluoroborate $LiBF_4$, lithium perchlorate $LiClO_4$, lithium trifluoromethanesulfonate $LiCF_3SO_3$, lithium bis(trifluoromethanesulfone)imide $LiN(CF_3So_2)_2$ (written LiTFSI), and lithium bis(trifluoromethanesulfone)methide $LiC(CF_3SO_2)_3$, and mixtures thereof.

The concentration of the lithium salt is greater than 1 mole per liter of said mixture of solvents. The concentration of the salt preferably lies in the range 1 mole/liter to 2 moles/liter.

The cathode comprises a material selected from lithium-containing oxides of nickel, of cobalt, and of manganese. These materials enable the cell to operate at high current densities.

The anode comprises a material selected from lithium, lithium alloys having 15% to 20% by weight of aluminum, lithium alloys having 15% to 35% by weight of zinc, and lithium insertion carbon-containing materials.

BRIEF DESCRIPTION OF THE DRAWINGS

Other characteristics and advantages of the present invention appear on reading the following examples, that are naturally given by way of illustrative but non-limiting example, and that are made with reference to the accompanying drawings, in which:

in FIGS. 4 and 5, discharge time $t$ of the cell in minutes is plotted along the abscissa and its voltage V in volts is plotted up the ordinate.

EXAMPLE 1

Prior art

A known prior art electrolyte was made from a mixture of solvents comprising 20% by volume of PC, 20% by volume of EC, and 60% by volume of dimethoxyethane DME. Thereafter, the lithium salt LiTFSI was added to a concentration of 1.5 moles/liter in the solvent mixture.

A test cell was assembled comprising a stainless steel working electrode having an area of 1 cm$^2$, a lithium counterelectrode, and the previously-prepared electrolyte. The reference electrode was a lithium wire. On the current-potential curves plotted using cyclical voltage and current measurements between 2 volts and 4.5 volts, the following current densities (in μA/cm$^2$) were observed:

| volts | 3.6 | 3.8 | 4.0 | 4.2 | 4.4 | 4.5 |
|---|---|---|---|---|---|---|
| μA/cm$^2$ | 0.046 | 0.07 | 0.16 | 1.168 | 13.6 | 25.6 |

It can be seen that current densities increased considerably at potentials greater than 4 V, a sign of electrolyte degradation at such potentials.

EXAMPLE 2

In accordance with the present invention, a mixture A was made of solvents comprising 20% by volume of PC, 20% by volume of EC, and 60% by volume of DMC, to which 1.5 moles/liter of LiTFSI lithium salt were added to obtain the electrolyte. The conductivity of the electrolyte, as measured at 20° C., was $9.5 \times 10^{-3}$ $\Omega^{-1}.cm^{-1}$.

A test cell analogous to that described in Example 1 was assembled including the previously made electrolyte. On current-voltage curves plotted by cyclical voltage and current measurement between 2 V and 4.5 V, the following current densities were observed:

| volts | 3.6 | 3.8 | 4.0 | 4.2 | 4.4 | 4.5 |
|---|---|---|---|---|---|---|
| μA/cm$^2$ | 0.05 | 0.08 | 0.15 | 0.31 | 1.41 | 3.08 |

The current densities measured in this electrolyte remain low, even above 4 V, and that gives rise to very good stability of the electrolyte at such potentials.

EXAMPLE 3

Figure 1:
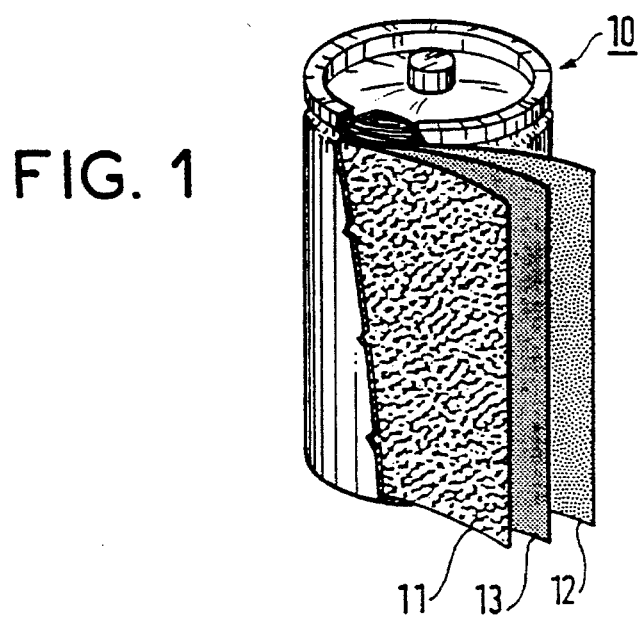
FIG. 1 shows a cell of the present invention.

A lithium rechargeable electrochemical cell of the present invention was made. The cell as shown in FIG. 1 was cylindrical, having a height of 50 mm and a diameter of 25.5 mm. The cell 10 comprised an anode 11 of lithium anode containing 15% by weight aluminum, a cathode 12, and a microporous separator 13 of polypropylene. The cathode 12 was made of a material containing lithium nickel oxide LiNiO$_2$, carbon (15% by weight of material), and a binder, said material was deposited on an aluminum current collector. The components were spiral-wound and impregnated with the electrolyte as made in Example 2.

The resulting cell was tested at ambient temperature under the following conditions:
charge: $I_c$=100 mA up to 4.1 V;
discharge: $I_d$=1 A down to 2.6 V.
The results are tabulated as follows:

N is the number of cycles performed until the restored capacity $C_d$ became less than or equal to half the initial capacity $C_i$ equivalent to the mass of active lithium after the first charge;

$C_{Td}$ is the total capacity discharged during the cycling, expressed in Ah;

R is the cycling efficiency calculated relative to lithium and expressed in %; and FOM stands for "figure of merit" as defined by the ratio $C_{Td}/C_i$.

Figure 2:
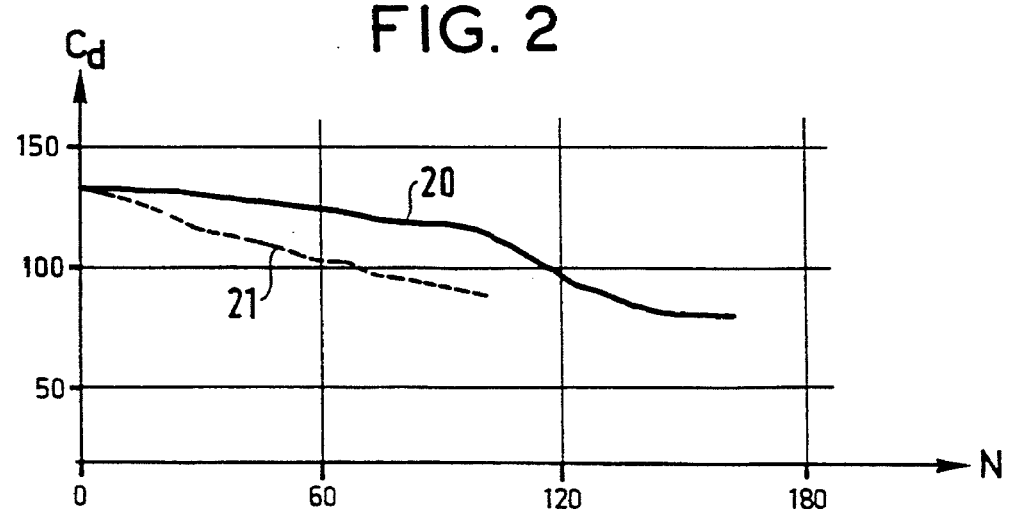
FIG. 2 shows the discharged capacity during cycling of a cell of the invention, analogous to that shown in FIG. 1, and of a prior art cell, with cycle number N being plotted along the abscissa and discharge capacity $C_d$ expressed in Ah/kg being plotted up the ordinate.

The capacity discharged during cycling is represented by curve 20 in FIG. 2. The test was performed three times and the results are tabulated below:

| Test No. | 1 | 2 | 3 |
|---|---|---|---|
| N | 159 | 159 | 159 |
| $C_{Td}$ | 222 | 230 | 234 |
| R | 97 | 97 | 97 |
| FOM | 29 | 30 | 30 |

The total loss of capacity over 100 cycles is only 16% of the initial capacity, which means that the electrolyte has good cycling behavior and that the cell of the invention has increased lifetime.

By way of comparison, a cell analogous to that shown in FIG. 1 but containing the prior art electrolyte as made in Example 1 was likewise tested in the same manner. The capacity discharged during cycling is shown by curve 21 in FIG. 2. The test was performed three times and the results obtained are tabulated below:

| Test No. | 1 | 2 | 3 |
|---|---|---|---|
| N | 65 | 104 | 65 |
| $C_{Td}$ | 97 | 143 | 96 |
| R | 92 | 95 | 92 |
| FOM | 13 | 19 | 13 |

The total loss of capacity after 100 cycles was 33% of the initial capacity, which means that there was considerable degradation of the electrolyte for cycling in that way.

EXAMPLE 4

Prior art

Two prior art binary mixtures of solvents were made comprising 40% by volume of PC or of EC and 60% by volume of DMC to which the LiTFSI lithium salt was added at a concentration of 1 mole/liter of solvent mixture.

At 20° C., the measured conductivity of the electrolyte comprising the solvent mixture PC 40%—DMC 60% was $8.3 \times 10^{-3}$ $\Omega^{-1}.cm^{-1}$.

A test cell was assembled comprising two electrodes: a lithium electrode and a nickel electrode on which a known quantity $Q_i$ of lithium corresponding to 1 mAh had previously been deposited. The separator was of microporous polypropylene. On each cycle, a quantity $Q_c$ of lithium was used, where $Q_c$ is less than $Q_i$. The total number of cycles performed N can be used to calculate the cycling efficiency R relative to lithium using the equation:

$$\left(1 - \frac{Q_i - Q_c}{NQ_c}\right) \times 100$$

The cycling efficiency is calculated for the two electrolytes as prepared above were as follows:
PC 40% - DMC 60%: 85.7%
EC 40% - DMC 60%: 86.2%

EXAMPLE 5

A test cell was assembled analogous to that described in Example 4 to perform lithium cycling in the electrolyte of the invention as made in Example 2, comprising the mixture A of solvents made up of 20% by volume of PC, 20% by volume of EC, and 60% by volume of DMC, to which 1.5 moles/liter of the LiTFSI lithium salt had been added. A cycling efficiency of 90% relative to lithium was obtained in that electrolyte, which efficiency is greater than the efficiencies calculated for the prior art mixtures of two carbonates as described in Example 4.

EXAMPLE 6

Prior art

Several prior art solvent mixtures were made, to which the lithium salt LiAsF$_6$ was added to the concentration of 1 mole/liter of solvent mixture. The mixtures prepared comprised the following, in volume:
mixture J: 30% of PC and 70% of DMC
mixture K: 30% of EC and 70% of DMC
mixture L: 35% of PC, 35% of EC, and 30% of DMC.

The conductivities of the electrolytes obtained from those mixtures was measured at 20° C. The results were as follows:
mixture J: $8.6 \times 10^{-3}$ $\Omega^{-1}.cm^{-1}$
mixture K: $9.8 \times 10^{-3}$ $\Omega^{-1}.cm^{-1}$
mixture L: $8.6 \times 10^{-3}$ $\Omega^{-1}.cm^{-1}$ And at 0° C., the electrolyte prepared on the basis of mixture L had a conductivity of $4.7 \times 10^{-3}$ $\Omega^{-1}.cm^{-1}$.

EXAMPLE 7

An electrolyte of the present invention was made by preparing a mixture of solvents comprising 15% by volume of PC, 15% by volume of EC, and 70% by volume of DMC. Thereafter the lithium salt LiAsF$_6$ was added to the mixture to a concentration of 1 mole/liter of solvent mixture.

The conductivity of that electrolyte as measured at 20° C. was $11.2 \times 10^{-3}$ $\Omega^{-1}.cm^{-1}$. That is higher than the conductivities of the prior art mixtures described in Example 6.

EXAMPLE 8

In order to obtain electrolytes of the present invention, several solvent mixtures were made comprising the following by volume:
mixture A: 20% of PC, 20% of EC, and 60% of DMC
mixture B: 20% of PC, 10% of EC, and 70% of DMC
mixture C: 30% of PC, 10% of EC, and 60% of DMC
mixture D: 40% of PC, 10% of EC, and 50% of DMC
to which were added 1 mole/liter of the lithium salt LiTFSI.

The electrolytes comprising solvent mixtures B and C solidified when the temperature was reduced to −30° C., that corresponding to mixture A solidified at about −40° C., and that corresponding to mixture D solidified at about −50° C.

The conductivities of the electrolytes were measured at ambient temperature and at low temperatures. The values obtained, expressed in $10^{-3}$ $\Omega^{-1}.cm^{-1}$ were as follows:

| temperature | 20° C. | 0° C. | −20° C. | −30° C. | −40° C. |
|---|---|---|---|---|---|
| mixture A | 9.5 | 6.6 | 3.8 | 1.3 | — |
| mixture B | 8.1 | 5.6 | 3.1 | — | — |
| mixture C | 8.2 | 5.5 | 3.1 | — | — |
| mixture D | 8.9 | 5.7 | 3.3 | 2.1 | 1.2 |

Mixture D has highest conductivity and best very low temperature performance.

EXAMPLE 9

Figure 3:
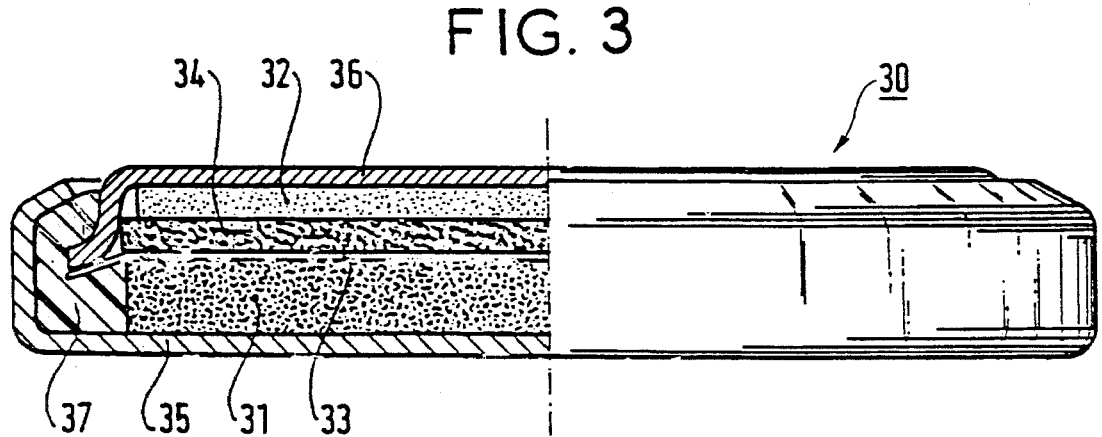
FIG. 3 shows another variant of a cell of the present invention.

A button-type rechargeable electrochemical cell of the present invention was made analogous to the cell shown in FIG. 3. The cell 30 contained a cathode 31 based on lithium nickel oxide LiNiO$_2$, an anode 32 of LiAl alloy, a microporous separator 33 of polypropylene, and a polypropylene fiber reservoir separator 34 in the form of a felt. The assembly was placed in a cup 35 having a cup 36 and closed in sealed manner by means of a sealing ring 37.

Two electrolytes were prepared on the basis of solvent mixtures A and D as prepared in Example 8, to which the lithium salt LiTFSI was added to the concentration of 1.5 moles/liter of solvent mixture. Each of the two electrolytes was placed in a cell analogous to that shown in FIG. 3. The following test was performed at ambient temperature and at low temperature:

charge at 0.25 mA/cm$^2$ up to 4.1 V;
discharge at 0.5 mA/cm$^2$ down to 3 V at ambient temperature and down to 2 V at −30° C.

Figure 4:
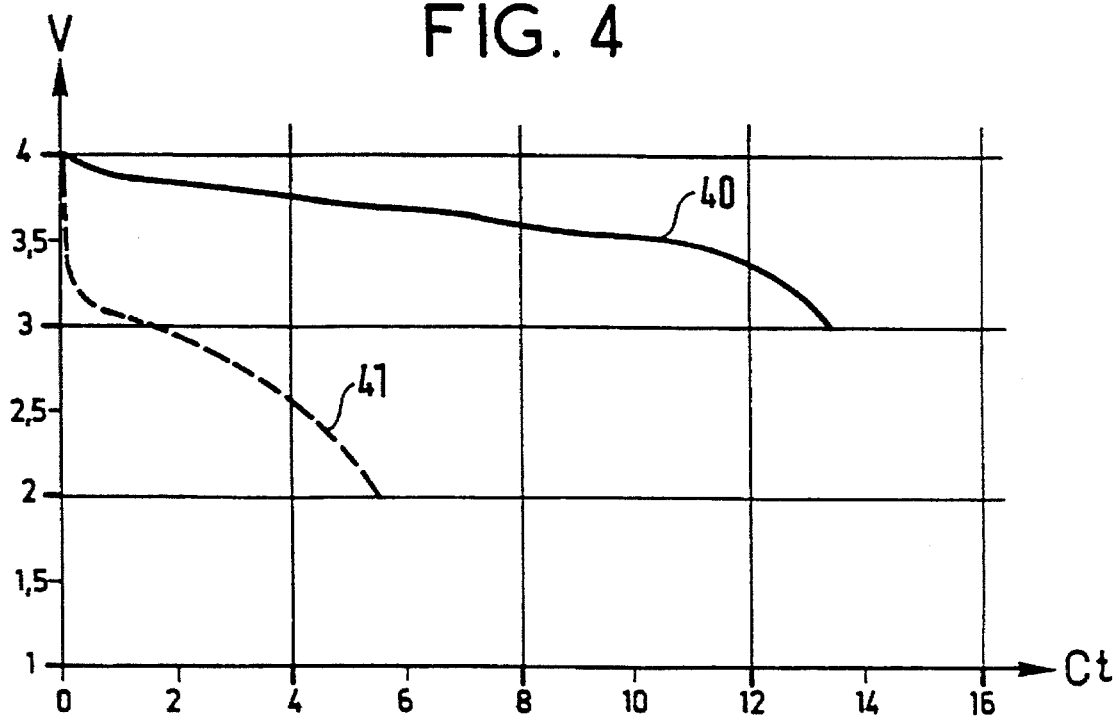
FIG. 4 shows discharge curves at two different temperatures for an electrochemical cell of the invention, analogous to that shown in FIG. 3.

In FIG. 4, curve 40 shows the discharger achieved at ambient temperature and curve 41 shows the discharge achieved at −30° C. for the cell containing the electrolyte based on solvent mixture A.

Figure 5:
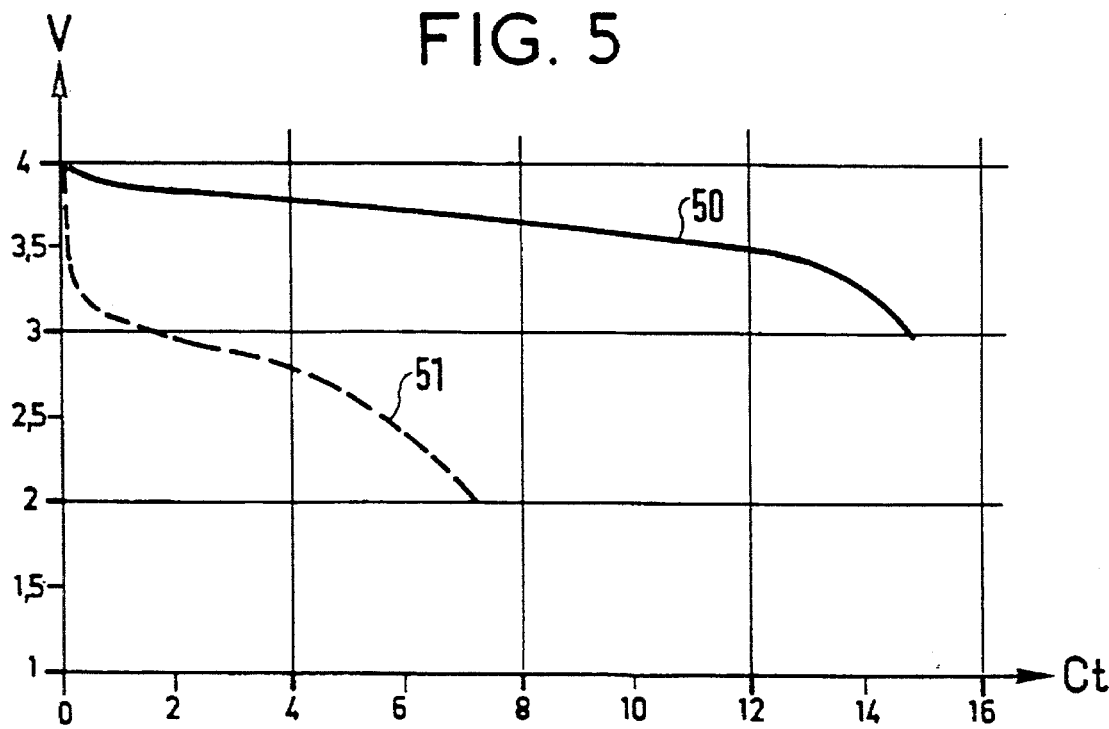
FIG. 5 is analogous to FIG. 4 for a variant electrolyte composition, in FIGS. 4 and 5, with the capacity $C_t$ of the cell in mAh being plotted along the abscissa, and its voltage V in volts being plotted up the ordinate.

FIG. 5 shows the discharge curves at ambient temperature (curve 50) and at −30° C. (curve 51) for the cell including the electrolyte made on the basis of solvent mixture D.

Compared with the capacity discharged at ambient temperature, the loss of capacity as measured during discharge at −30° C. is 62% for the electrolyte based on mixture A, and only 55% for the electrolyte prepared on the basis of mixture D.

EXAMPLE 10

A lithium rechargeable electrochemical cell of the present invention was made analogous to the cell shown in FIG. 1, but of different dimensions and having an anode based on carbon. The cell was 42.4 mm long and had a diameter of 16.6 mm. Its anode was made from a mixture of 1.5 grams (g) of carbon and 15% by weight of binder deposited on a copper current collector, and its cathode contained 3.60 g of LiNiO$_2$.

The lithium salt LiPF$_6$ was added to solvent mixture A as prepared in Example 2 to a concentration of 1 mole/liter of the solvent mixture. 4.50 g of the electrolyte was then placed in a cell analogous to that described above.

The resulting cell had a capacity of about 500 mAh. It was tested at various temperatures under the following conditions:

charge at ambient temperature: $I_c$=500 mA up to 4.1 V;

discharge at various different temperatures: $I_d$=250 mA down to 2.5 V.

Figure 6:
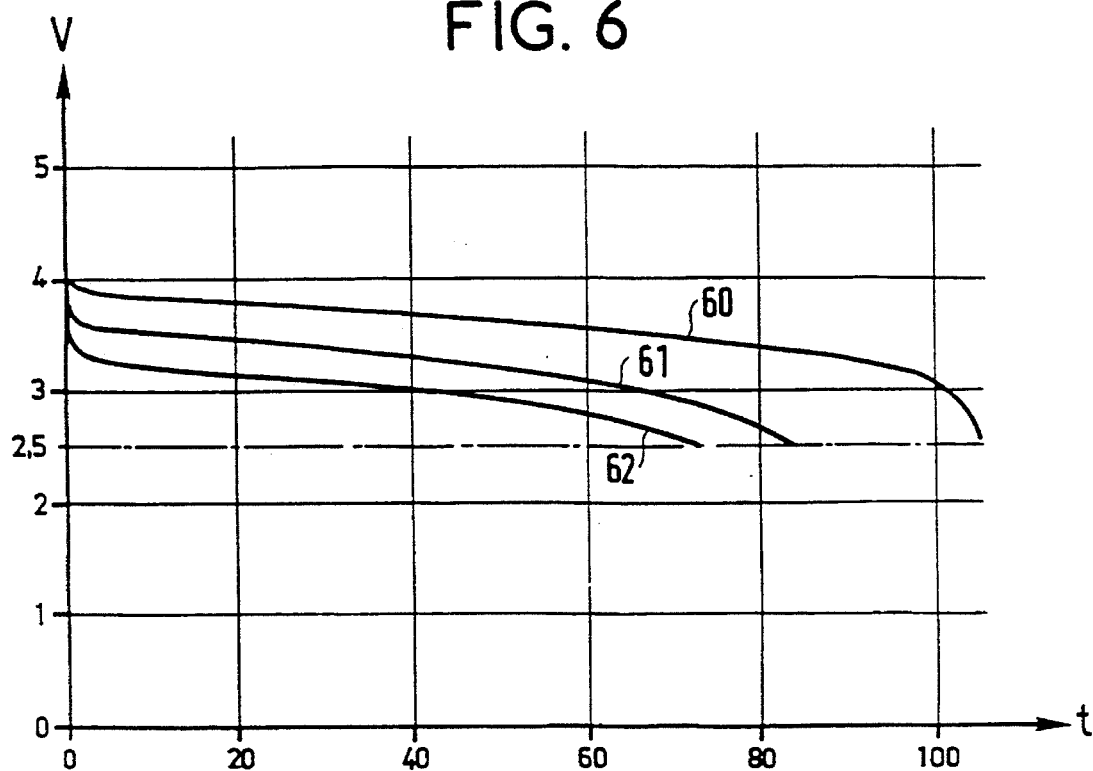
FIG. 6 shows discharge curves at three different temperatures for an electrochemical cell of the invention.

FIG. 6 shows discharge curve 60, 61, and 62 as obtained at the following temperatures respectively: ambient, −10° C., and −20° C.

By way of comparison, a prior art electrolyte was made by preparing a mixture of solvents comprising 50% by volume of EC and 50% by volume of DMC. Thereafter the lithium salt LiPF$_6$ was added to the mixture to a concentration of 1 mole/liter of solvent mixture. 4.50 g of that electrolyte was then placed in a generator analogous to that described above.

Figure 7:
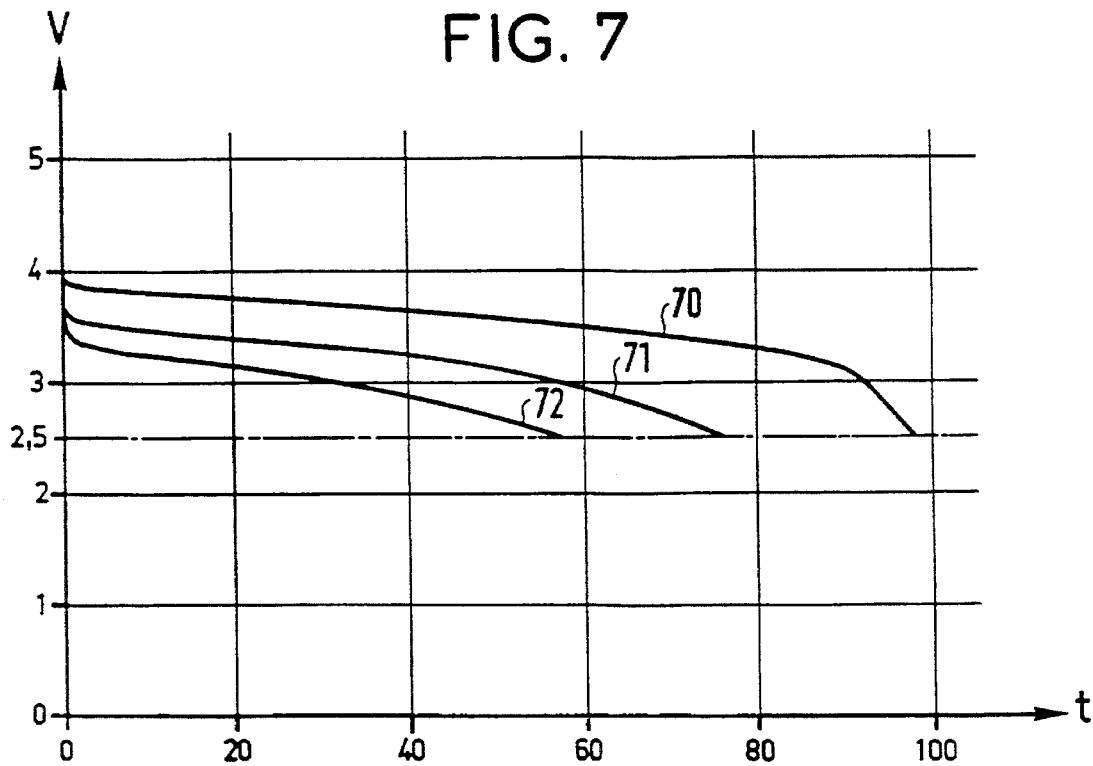
FIG. 7 is analogous to FIG. 6, but for a prior art cell.

That generator was tested under the same conditions as above. FIG. 7 is a plot of discharge curves 70, 71, and 72 as obtained at the following temperatures respectively: ambient, −10° C., and −20° C.

The results of the measured capacities discharged down to 2.5 V are tabulated below:

|  | 50/50 EC/DMC | 20/20/60 PC/EC/DMC | |
| --- | --- | --- | --- |
| discharge temperature | capacity mAh | capacity mAh | improvement + % |
| 20° C. | 396 | 437 | 10 |
| −10° C. | 312 | 354 | 13 |
| −20° C. | 237 | 300 | 26 |

At high current and at very low temperature, the cell of the present invention provides an increase in capacity of better than one-fourth compared with an analogous cell but containing a prior art electrolyte.

Naturally, the present invention is not limited to the embodiments described, but is capable of numerous variants that will occur to the person skilled in the art without going beyond the spirit of the invention. In particular, without going beyond the ambit of the invention, it would be possible to vary the consumption of the solvent mixture within the ranges given.

We claim:

1. A lithium rechargeable electrochemical generator comprising an anode formed of pure or alloyed lithium or of lithium-containing carbon, a cathode of metal oxide, and an electrolyte comprising a mixture of aprotic organic solvents containing a lithium salt, said mixture consiting essentially of:

5% to 40% by volume of proplylene carbonate;

10% to 20% by volume of ethylene carbonate; and

50% to 85% by volume of dimethyl carbonate.

2. An electrochemical generator according to claim 1, in which said mixture consists of 20% by volume of propylene carbonate, 20% by volume of ethylene carbonate, and 60% by volume of dimethyl carbonate.

3. An electrochemical generator according to claim 1, in which said mixture consists of 15% by volume of propylene carbonate, 15% by volume of ethylene carbonate, and 70% by volume of dimethyl carbonate.

4. An electochemical generator according to claim 1, in which said mixture consists of 40% by volume of propylene carbonate (PC), 10% by volume of ethylene carbonate (EC), and 50% by volume of dimethyl carbonate.

5. An electochemical generator according to claim 1 in which said lithium salt is selected from: lithium hexafluoroarsenate, lithium hexafluorophosphate, lithium tetrafluoroborate, lithium perchlorate, lithium trifluoromethanesulfonate, lithium bis(trifluoromethanesulfone)imide, and lithium bis(trifluoromethanesulfone)methide, and mixtures thereof.

6. An electrochemical generator according to claim 5, in which the concentration of said lithium salt is greater than 1 mole/liter of said solvent mixture.

7. A cell according to claim 1, in which said cathode comprises a material selected from: lithium-containing oxides of nickel, of cobalt, and of manganese.

8. A cell according to claim 1, in which said anode comprises a material selected from: lithium, lithium alloys with 15% to 20% by weight of aluminum, lithium alloys with 15% to 35% by weight of zinc, and lithium insertion carbon-containing materials.

* * * * *